Figure 1:
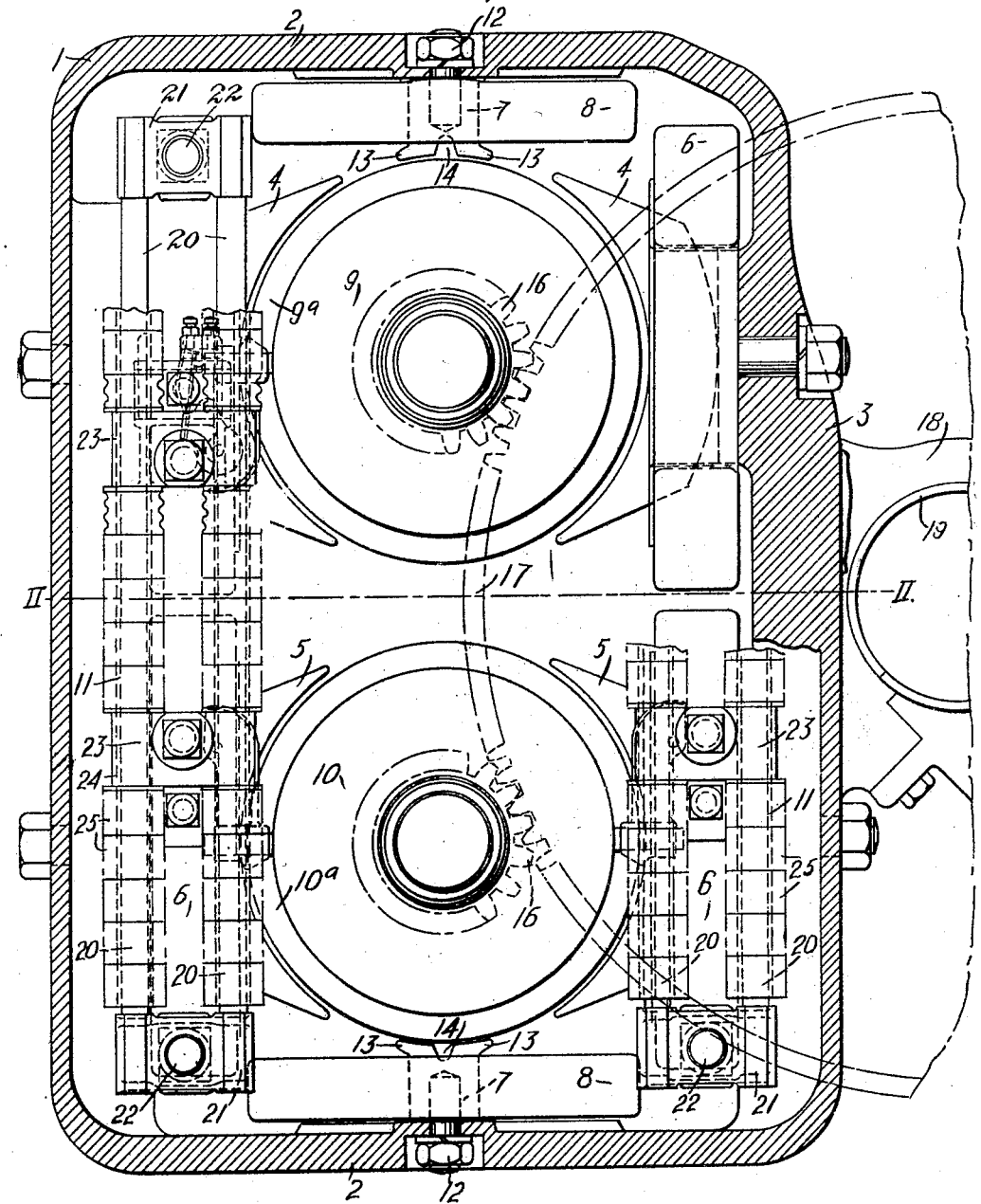

N. W. STORER.
DYNAMO ELECTRIC MACHINE.
APPLICATION FILED MAY 11, 1914.

1,255,487.

Patented Feb. 5, 1918.
2 SHEETS—SHEET 1.

WITNESSES:
F. A. Lind.
W. R. Coley

INVENTOR
Norman W. Storer
BY
Wesley G. Carr
ATTORNEY

N. W. STORER.
DYNAMO ELECTRIC MACHINE.
APPLICATION FILED MAY 11, 1914.
1,255,487.
Patented Feb. 5, 1918.
2 SHEETS—SHEET 2.
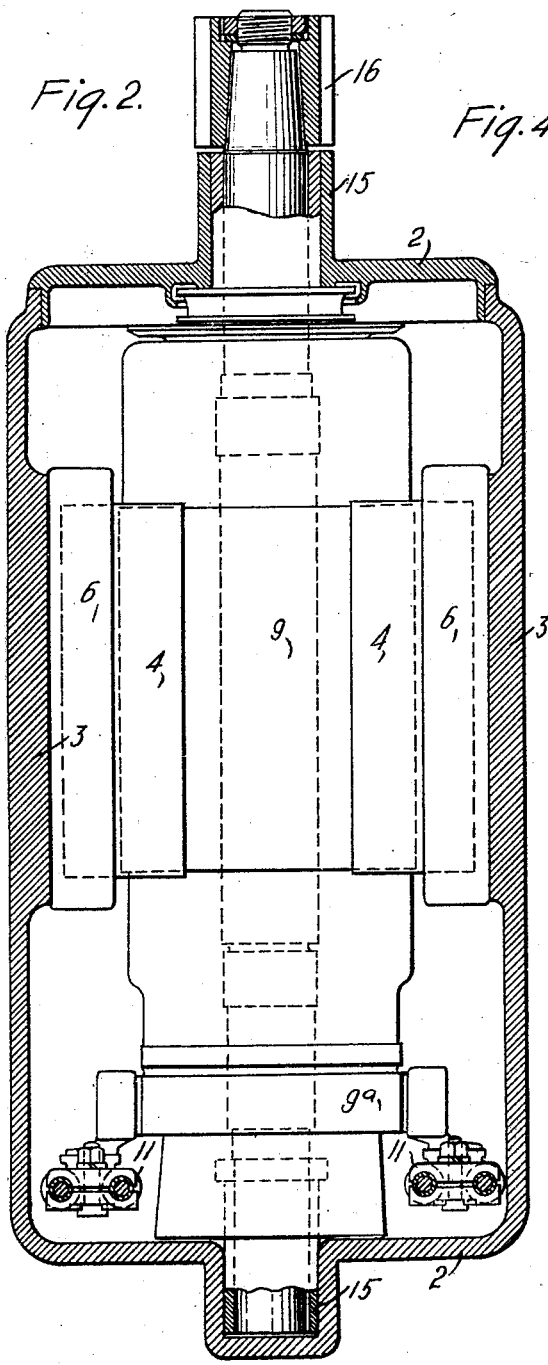
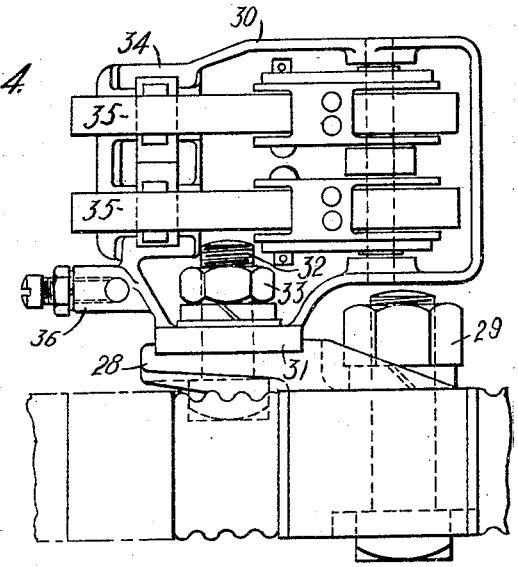
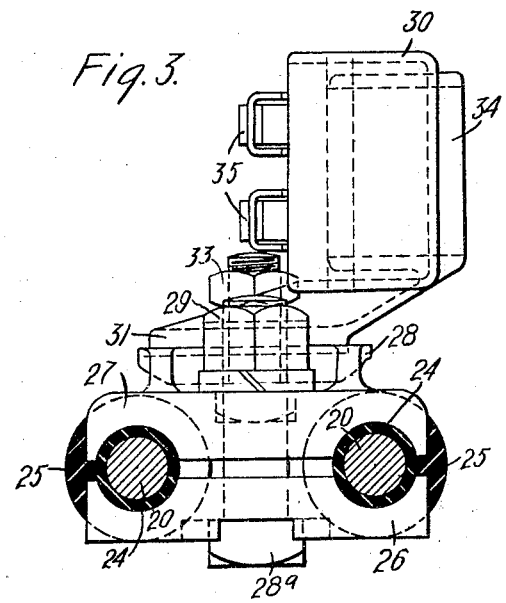
WITNESSES:
F. A. Lind.
W. A. Coley
INVENTOR
Norman W. Storer
BY
Wesley G. Carr
ATTORNEY

UNITED STATES PATENT OFFICE.

NORMAN W. STORER, OF PITTSBURGH, PENNSYLVANIA, ASSIGNOR TO WESTINGHOUSE ELECTRIC AND MANUFACTURING COMPANY, A CORPORATION OF PENNSYLVANIA.

DYNAMO-ELECTRIC MACHINE.

1,255,487.  Specification of Letters Patent.  Patented Feb. 5, 1918.

Application filed May 11, 1914. Serial No. 837,699.

*To all whom it may concern:*

Be it known that I, NORMAN W. STORER, a citizen of the United States, and a resident of Pittsburgh, in the county of Allegheny and State of Pennsylvania, have invented a new and useful Improvement in Dynamo-Electric Machines, of which the following is a specification.

My invention relates to dynamo-electric machines, and it has special reference to novel constructional features which are particularly adapted for employment in electric motors that are used in high-voltage, direct-current railway service.

One object of my invention is to provide a simple and reliable brush-supporting construction which shall be especially adapted to withstand relatively high voltages and which, in particular, shall include insulating means that provides relatively long surface leakage paths between the current-carrying parts and the frame of the machine.

More specifically stated, the object of my invention is to provide a motor of the twin-armature type in which the corresponding brush holding devices for the several armatures are carried by the same supporting means, thereby simplifying the constructional and insulating problems to a material extent, and decreasing the number of parts required.

Another object of my invention is to effect a decrease in the weight and expense of machines of the above-indicated class by eliminating certain unnecessary material from the commutating polar projections, as hereinafter more fully set forth.

My present invention generally comprises supporting members that are internally carried by the end frames of the machine, current-carrying devices that are clamped to the supporting members at intervals, in order to coact with the commutator cylinders of the several armatures, and insulating means carried by the supporting members that provide relatively long surface-leakage paths between the current-carrying parts and the frame of the machine.

In commutating polar machines of the type in question which are provided with the usual short-chord armature windings, and where the commutating pole width is relatively great, it has been found that only the tips of the commutating polar projections are useful for commutating purposes, and, consequently, I recess the central portion of the projections, thereby effecting a considerable economy of weight and expense, without sacrificing the electrical operating characteristics of the machine.

In the accompanying drawing, Figure 1 is a view, partially in section and with parts broken away, of a dynamo-electric machine constructed in accordance with my invention; Fig. 2 is a sectional view taken on the line II—II of Fig. 1; Fig. 3 is an enlarged view of the brush-supporting construction illustrated in Fig. 2; and Fig. 4 is a plan view of the device shown in Fig. 3.

Referring to the drawing, the apparatus here shown comprises a suitable incasing frame 1 that is provided with end portions 2 of relatively small cross-section and side portions 3 of materially larger cross-section; a plurality of pairs of coöperating main polar projections 4 and 5, said pairs being located near the respective ends of the frame and being provided with main field coils 6; a commutating polar projection 7 associated with each end portion 2 of the frame and provided with a commutating field coil 8; a pair of armatures 9 and 10 of like construction which are respectively located within the pairs of main polar projections 4 and 5 and are provided with commutator cylinders $9^a$ and $10^a$, respectively; and brush supporting means 11.

The commutating polar projections 7 are preferably secured to the end portions 2 of the frame 1 by means of bolts and nuts 12 and are severally provided with a pair of magnetizing tips 13, and a recess 14 which is preferably disposed half way between the two tips 13, for a purpose already pointed out.

The shafts of the twin armatures 9 and 10 are suitably supported near their ends by housing 15, and a plurality of pinions 16 are respectively located on the corresponding ends of the several shafts. A gear wheel 17 is rotatably mounted upon a bridging member 18, of any suitable construction, and is adapted to drive a wheel axle 19, the gear wheel being also adapted to mesh with the several pinions 16. It should be understood that, preferably, a second dynamo-electric machine, similar to the one shown in Fig. 1, is disposed upon the opposite side of the bridging member 18 to operatively engage the gear wheel 17.

The brush supporting means 11 comprises a plurality of pairs of rods 20 that are suitably clamped to portions of the end frames 2 by means of clamping members 21 and bolts 22; and a plurality of brush-holding devices 23 that are disposed, at predetermined intervals, upon the rods 20 to make suitable electrical contact with the commutator cylinders $9^a$ and $10^a$. The several pairs of rods 20 are respectively disposed to pass in proximity to diametrically opposite points of the commutator cylinders and are wrapped throughout their entire length with suitable insulating material 24, the rods being all located in substantially the same plane. Disposed around the wrapped rods, intermediate the respective brush-holding devices 23 and between the adjacent end-frames and the several devices, are a plurality of insulating members, such as porcelain spools 25, that are preferably formed with corrugated surfaces, as indicated, in order to provide relatively long surface-leakage paths, for a purpose hereinbefore specified.

The brush-holding devices 23 severally comprise a pair of complementary and doubly-recessed clamping members 26 and 27 that are disposed upon opposite sides of the insulated rods 20 and one of which is provided with an apertured extended portion or lug 28, the two clamping members being suitably secured together by means of a bolt $28^a$ and a nut 29. A brush-holding frame-work 30 has an apertured ear 31 on one of its side walls and the member 30 is secured to the extended portion 28 by means of a bolt 32 and a coöperating nut 33. A current-collecting member or brush 34 is disposed to slide within the frame work 30, being suitably influenced by a plurality of spring-pressed arms 35, in accordance with familiar practice. A terminal member 36 for the brush-holding device is adapted for connection to the circuit conductors (not shown), in the usual manner. It will be observed that the several brushes 34 are thus disposed to engage the commutator cylinders in a plane that is disposed transversely at right angles to the common plane of the several rods 20.

I do not wish to be restricted to the specific structural details herein set forth, but desire that only such limitations shall be imposed as are indicated in the appended claims.

I claim as my invention:

1. In a dynamo-electric machine, the combination with an incasing frame and a plurality of rotatable members respectively having a current-delivering surface, of a supporting member internally carried by the ends of said frame, insulating means inclosing said member, and current collecting devices secured to the supporting member to make contact with said current-delivering surfaces.

2. In a dynamo-electric machine, the combination with an incasing frame and a plurality of rotatable armatures respectively provided with a commutator cylinder, of a supporting rod internally carried by the ends of said frame, insulating material inclosing said rod, brush-holding devices secured to said rod, and brushes disposed in said holding device to make contact with said commutator cylinders.

3. In a dynamo-electric machine, the combination with an incasing frame and a plurality of rotatable armatures arranged in parallel relation and respectively provided with a commutator cylinder, of a plurality of sets of supporting rods internally clamped to the ends of said frame and respectively located in proximity to similarly located portions of said commutator cylinders, all of said rods being disposed in substantially the same transverse plane, insulating covers severally disposed on said rods, a plurality of brush-holding devices severally clamped to said sets of rods, and a plurality of brushes severally disposed in said devices to make contact with said cylinder in said similarly located portions thereof.

4. In a dynamo-electric machine, the combination with an incasing frame and a plurality of rotatable armatures arranged in parallel relation and respectively provided with a commutator cylinder, of a plurality of pairs of supporting rods internally clamped to the ends of said frame and respectively located in proximity to diametrically opposite points of said commutator cylinders, all of said rods being located in a plane at right angles to the longitudinal axes of said armatures, insulating wrappers for the several rods, a plurality of brush-holding devices severally clamped to said pairs of rods, and a plurality of brushes severally disposed in said devices to make contact with said cylinders substantially in said diametrically opposite points.

5. In a dynamo-electric machine, the combination with an incasing frame provided with a pair of armatures having commutator cylinders arranged in parallel relation, of a plurality of pairs of supporting rods internally clamped to the ends of said frame and all disposed in substantially the same transverse plane, insulating wrappers for the several rods, a plurality of brush-holding devices clamped at predetermined intervals to said pairs of wrapped rods, rod-inclosing members having an external surface adapted to present a relatively long creepage distance and disposed between the corresponding devices and between each device and the adjacent end-frame, and a plurality of brushes severally disposed in said devices to make contact with said cylinders in planes substantially at right angles to the plane of said rods.

In testimony whereof, I have hereunto subscribed my name this 24th day of April, 1914.

NORMAN W. STORER.

Witnesses:
 JACOB STAIR, Jr.,
 B. B. HINES.

Copies of this patent may be obtained for five cents each, by addressing the "Commissioner of Patents, Washington, D. C."